United States Patent
Park

(10) Patent No.: US 7,348,958 B2
(45) Date of Patent: Mar. 25, 2008

(54) APPARATUS AND METHOD FOR REDUCING POWER CONSUMPTION OF A BACKLIGHT CONTROL UNIT OF A MOBILE COMMUNICATION TERMINAL

(75) Inventor: Woo-Seog Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 10/805,108

(22) Filed: Mar. 19, 2004

(65) Prior Publication Data
US 2004/0196251 A1 Oct. 7, 2004

(30) Foreign Application Priority Data
Apr. 1, 2003 (KR) ............ 10-2003-0020521

(51) Int. Cl.
G09G 3/36 (2006.01)
(52) U.S. Cl. .......... 345/102; 345/87; 345/211; 345/212
(58) Field of Classification Search ........ 345/87, 345/102, 211, 212
See application file for complete search history.

(56) References Cited

U.S. PATENT DOCUMENTS

| | | | |
|---|---|---|---|
| 6,278,887 B1 * | 8/2001 | Son et al. ............. | 455/566 |
| 6,529,182 B1 * | 3/2003 | Burton ................ | 345/102 |
| 6,807,430 B2 * | 10/2004 | Woods et al. .......... | 345/102 |
| 6,873,322 B2 * | 3/2005 | Hartular .............. | 345/212 |
| 7,138,992 B2 * | 11/2006 | Nakamura ............. | 345/102 |

FOREIGN PATENT DOCUMENTS

| | | |
|---|---|---|
| JP | 06-285106 | 10/1994 |
| JP | 2001-143878 | 5/2001 |
| JP | 2002-032131 | 3/2002 |

* cited by examiner

Primary Examiner—My-Chau T. Tran
(74) Attorney, Agent, or Firm—Lee, Hong, Degerman, Kang & Schmadeka

(57) ABSTRACT

A method and apparatus for reducing power consumption of a backlight control unit of a mobile communication terminal are disclosed. The output voltage of a voltage source is measured. If the output voltage is at least a predetermined value, the output of the voltage source is used to drive a backlight illumination unit. If the output voltage is below the predetermined value, an up-converted constant voltage is used to drive the backlight illumination unit.

28 Claims, 3 Drawing Sheets

| CONTROL SIGNAL | BACKLIGHT ILLUMINATION UNIT NOT POWERED | BACKLIGHT ILLUMINATION UNIT POWERED | |
|---|---|---|---|
| | | V_SOURCE ≥ V_REF CONVERTER UNIT POWERED SWITCHING UNIT ENABLED | V_SOURCE<V_REF CONVERTER UNIT NOT POWERED SWITCHING UNIT DISABLED |
| BYPASS_EN | L | H | L |
| CONVERT_EN | L | L | H |

APPARATUS AND METHOD FOR REDUCING POWER CONSUMPTION OF A BACKLIGHT CONTROL UNIT OF A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Application No. 20521/2003, filed on Apr. 1, 2003, the contents of which are hereby incorporated by reference herein in their entirety:

BACKGROUND OF THE INVENTION

1. Field of the Invention

The present invention relates to a mobile communication terminal, and more particularly, to an apparatus and method for controlling power consumption of the backlight control unit of a mobile communication terminal.

2. Description of the Related Art

In general, a mobile communication terminal is a device the size of which is limited to facilitate ease of carrying and use. Most users of mobile communication terminals favor compact terminals.

Generally, mobile communication terminals are powered, for example, by batteries which are charged by a charging unit that is not carried with the terminal. That is, users carry the mobile communication terminal without the charging unit. Therefore the time of use of the terminal is limited by the charge of the battery.

There are two ways to extend the time of use before the mobile communication terminal must be returned to the charging unit. A larger capacity battery may be mounted in the terminal. Alternately, power consumption of the battery may be reduced.

Increased battery capacity generally requires a larger battery. A larger battery in the terminal would not meet users' demand for a more compact terminal. Therefore, manufacturers attempt to minimize power consumption of the battery.

As the use of mobile communication terminals having a liquid crystal display (LCD) has increased, the use of a backlight at the rear side of the LCD panel in order to illuminate the LCD has increased. The backlight is generally battery-driven.

FIG. 1 illustrates a conventional backlight control unit 1 of a mobile communication terminal. As illustrated in FIG. 1, the backlight control unit 1 includes a voltage source such as a battery (not shown), a converter 10, a backlight illumination unit 20 driven by power from the converter 10, and a backlight power switch 30.

The converter 10, for example a charge pump or DC-DC converter, converts the voltage (VBATT) of the battery to a constant DC voltage (V_BACK). A backlight enable signal (LCD_BACK_EN) controls application of the constant DC voltage to the backlight illumination unit 20.

The backlight illumination unit 20 includes LEDs (LED1, LED2 and LED3) connected in parallel to emit light for illuminating the LCD and resistors (R1, R2 and R3) connected in series to each LED for controlling current. The backlight power switch 30, for example a transistor (Q1), turns a current flowing to the backlight illumination unit 20 on and off according to the backlight enable signal (LCD_BACK_EN).

The battery voltage (VBATT) generally varies between 4.2 VDC and 3.0 VDC as battery power is consumed. If such a voltage were used to power the backlight illumination unit 20, the brightness of the LEDs would also vary, thereby causing the illumination of the LCD to vary. In order to prevent such varying illumination, the converter 10 is used to provide a constant DC voltage (V—BACK) and, hence, consistent illumination of the LCD.

When a CPU (not shown) generates the backlight enable signal (LCD_BACK_EN), the converter 10 and the backlight power switch 30 are turned on. The constant DC voltage (V_BACK) from the converter 10 is applied to the backlight illumination unit 20 and current flows through the backlight power switch 30 through the LEDs (LED1, LED2 and LED3) and the resistors (R1, R2 and R3). The LEDs emit light and the LCD is illuminated.

In order to provide a constant DC level, the converter 10 operates as a down-converter when the voltage (VBATT) of the battery is equal to or above a reference voltage, for example 4V, and operates as an up-converter when the voltage of the battery is below the reference voltage. In this manner, the converter 10 outputs a constant 4.0 VDC (V_BACK) regardless of the change in the voltage level of the battery (V_BATT). However, a typical converter 10 has efficiency below 90%. Therefore, 10% or more of battery voltage is unnecessarily wasted and available use time for the terminal 1 is decreased.

Therefore, there is a need for an apparatus and method that can control the application of power to the backlight illumination unit for an LCD display of a mobile communication terminal in a manner that reduces power consumption of the backlight control unit. The present invention meets these and other needs.

SUMMARY OF THE INVENTION

The present invention is directed to a to an apparatus and method for controlling application of power to a backlight illumination unit of a mobile communication device. Specifically, the invention is directed to an apparatus and method for reducing power consumption of the backlight control unit of a mobile communication device by limiting unnecessary power consumption of a converter when the voltage output of a power source is sufficient to drive the backlight illumination unit.

An object of the present invention is to provide an apparatus and method for reducing power consumption of a mobile communication terminal by reducing unnecessary down-converting operations of a constant voltage converter in the backlight control unit. By detecting when the voltage level of a power source is equal to or higher than a predetermined value, power is removed from a constant voltage converter when down-conversion would be performed, thereby reducing power consumption of the backlight control unit and conserving battery power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a mobile communication device having a backlight control unit and enabling voice functions, the present invention includes an apparatus and method for determining when the voltage level of a power source is equal to or higher than a predetermined value in order to facilitate removal of power from a constant voltage converter when down-conversion would be performed.

In one aspect of the invention, means for converting the output voltage of a power source to a constant voltage level, means for turning the converting means off and on, and means for applying either the constant voltage level or the output of the power source to a backlight illumination unit are provided. When the power source voltage is at or above a predetermined value, power is removed from the converting means and the output of the power source is applied to the backlight illumination unit. When the power source voltage is below the predetermined value, power is applied to the converting means and the constant voltage level is applied to the backlight illumination unit.

It is contemplated that the output of the power source may be scaled by a factor, preferably approximately 50%. It is further contemplated that the output of the power source may be converted, for example by an analog-digital converter, to digital data, with the digital data corresponding to the output of the power source compared to data corresponding to the predetermined value in order to determine if power is removed from the converting means.

It is contemplated that the converting means may be a charge-pump or a DC-DC converter. It is further contemplated that means for removing power from the backlight illumination unit independent of the converting means may be provided, preferably a transistor. Moreover, it is contemplated that the applying means may be a field effect transistor (FET).

In another aspect of the invention, an apparatus is provided having a backlight illumination unit, a converting unit, a switching unit, and a controller. The converting unit is adapted to convert the output voltage of a power source to a constant voltage level. The switching unit is adapted to bypass the converting unit and apply the output of the power source to the backlight illumination unit. The controller is adapted to determine the output voltage of the power source, turn the converting unit off and on and enable and disable the switching unit.

If the voltage level of the power source is equal to or greater than a predetermined value, the controller enables the switching unit and removes power from the converting unit so the power source voltage is applied to the backlight illumination unit. If the voltage level of the power source is smaller than the predetermined value, the controller applies power to the converting unit and disables the switching unit so that the power source voltage is up-converted to a constant voltage level, preferably the predetermined value, and applied to the backlight illumination unit.

It is contemplated that the output of the power source may be scaled by a factor, preferably approximately 50%. It is further contemplated that the output of the power source may be converted to digital data by the controller, which preferably includes an analog-digital converter, with the digital data corresponding to the output of the power source compared by the controller to data corresponding to the predetermined value in order to determine whether the switching unit or the converting unit is to be powered on.

It is contemplated that the converting unit may be a charge-pump or a DC-DC converter. It is further contemplated that the controller may be a CPU adapted to power the backlight illumination unit off independent from the converting unit, preferably via a transistor. Moreover, it is contemplated that the switching unit may be a field effect transistor (FET).

In another aspect of the invention, a mobile communication device is provided having a backlight illumination unit powered by a voltage source, a converter, a switch, and a controller. If the output of the voltage source is equal to or greater than a predetermined value, the controller enables the switch and removes power from the converter so that the voltage source is applied directly to the backlight illumination unit. If the output of the voltage source is smaller than the predetermined value, the controller applies power to the converter and disables the switch so that the power source voltage is up-converted to a constant voltage level and applied to the backlight illumination unit.

It is contemplated that the predetermined value is a voltage level at which the backlight illumination unit is fully illuminated, for example a level of approximately 4 Volts DC. It is further contemplated that the converter may be a charge-pump or a DC-DC converter. Moreover, it is contemplated that the backlight illumination unit may include two or more LEDs.

In another aspect of the invention a method for reducing power consumption of a backlight control unit of a mobile communication device is provided, the method utilizing an apparatus of the present invention. The method includes measuring the output of a voltage source and either applying power to a converting means to apply a constant voltage level to a backlight illumination unit or removing power from the converting means and applying the output of the voltage source to the backlight illumination unit. The constant voltage level is applied to the backlight illumination unit if the output of the voltage source is below a predetermined value. The output of the voltage source is applied to the backlight illumination unit if it is at or above the predetermined value. The constant voltage level is preferably equal to or greater than the predetermined value.

It is contemplated that the method may include scaling the output of the voltage source, preferably by approximately 50%. It is further contemplated that the method may include converting the output of the voltage source to digital data and comparing the digital data to data corresponding to the predetermined value. Moreover, it is contemplated that the method may include turning the backlight illumination unit off independent of the converting means.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to an apparatus and method for reducing power consumption in a backlight control unit of a mobile communication device by controlling application of power to a backlight illumination unit such that a converter is turned off and the output of a voltage source is applied directly to the backlight illumination unit when the output of the voltage source is at or above a predetermined value.

Although the present invention is illustrated with respect to a mobile communication device, it is contemplated that the present invention may be utilized anytime it is desired to reduce power consumption in a device having a backlight illumination unit or in any device utilizing a voltage source to power a display.

Figure 1:
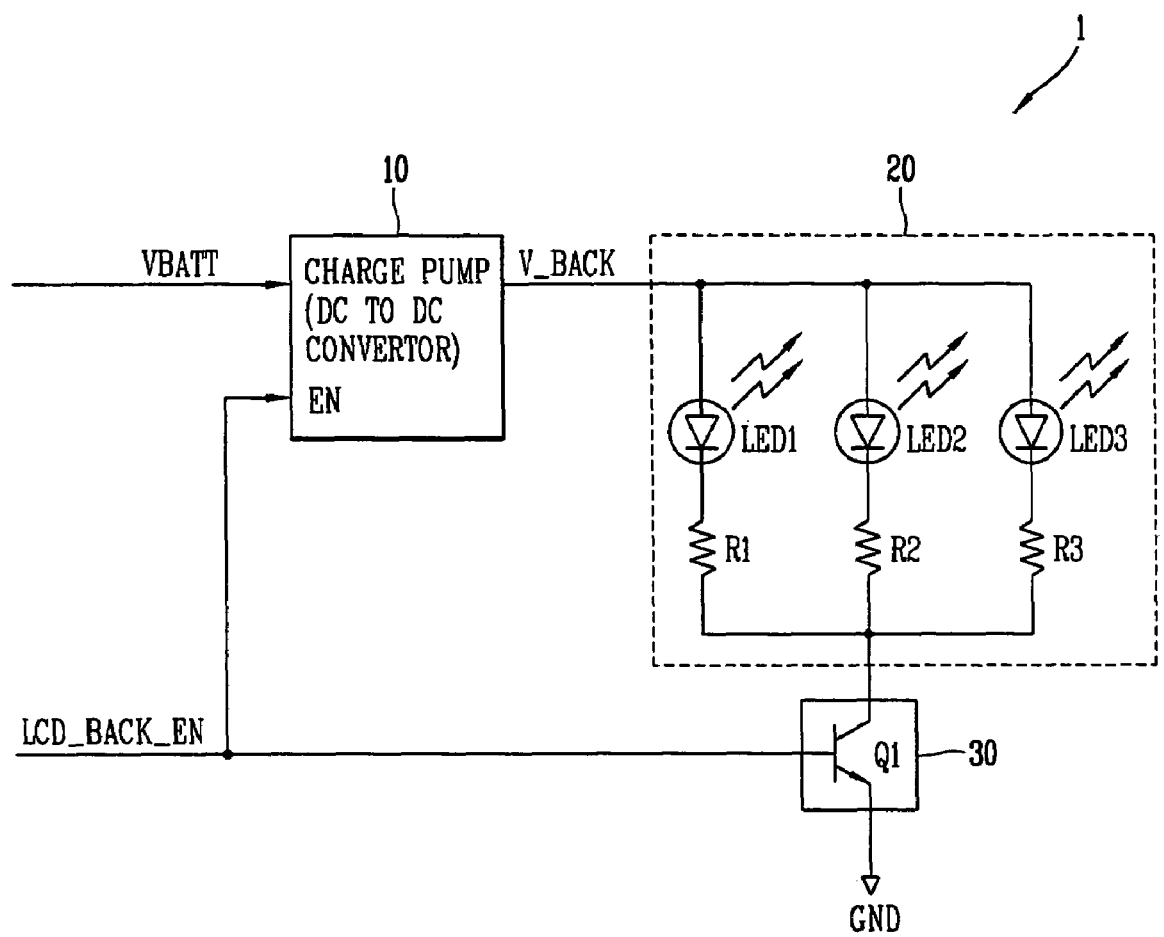
FIG. 1 illustrates a conventional apparatus for controlling the application of power to a backlight illumination unit of a mobile communication terminal.
Figure 2:
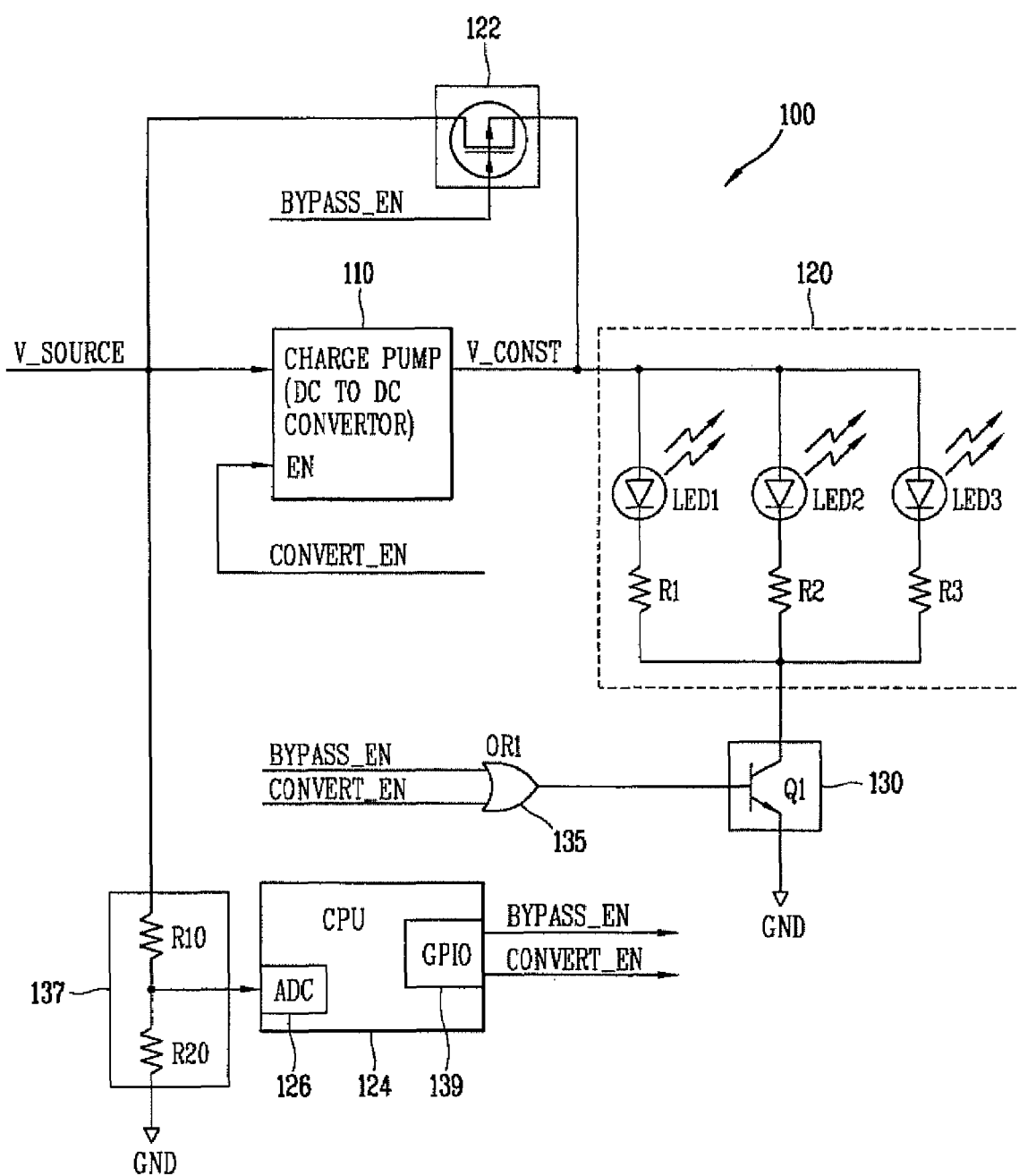
FIG. 2 illustrates an apparatus for controlling the application of power to a backlight illumination unit of a mobile communication device in accordance with the present invention.

Referring to FIG. 2, an apparatus for controlling the application of power to a backlight illumination unit of a mobile communication device is illustrated. The apparatus 100 includes a converting unit 110, a backlight illumination unit 120, a switching unit 122, and a controller 124.

The converting unit 110 converts the voltage (V_SOURCE) of a power source (not shown) into a constant voltage (V_CONST). A converter enable signal (CONVERT_EN) controls the application of the constant voltage to the backlight illumination unit 120. Preferably, the converting unit 110 is a charge-pump or a DC-DC converter.

In order to provide a constant voltage level, the converting unit 110 operates as a down-converter when the voltage (V_SOURCE) of the power source is equal to or above a predetermined value and operates as an up-converter when the voltage of the power source is below the predetermined value. In this manner, the converting unit 110 outputs a constant voltage (V_CONST) regardless of the change in the voltage level (V_SOURCE) of the power source. Preferably, the predetermined value is a voltage level at which the backlight illumination unit 120 fully illuminates a display (not shown), for example approximately 4 Volts DC.

The backlight illumination unit 120 includes LEDs (LED1, LED2 and LED3) connected in parallel for emitting light to illuminate the display. Resistors (R1, R2 and R3) are connected in series to each LED for control the current. A backlight power switch 130 turns on and off current flowing to the backlight illumination unit 120. Preferably, the backlight power switch 130 is a transistor (Q1). It is contemplated that the backlight illumination unit 120 may include any number of LEDs and resistors.

The switching unit 122 facilitates bypassing the converting unit 110 to apply the output voltage of the power source (V_SOURCE) to the backlight illumination unit 120. A bypass enable signal (BYPASS_EN) controls the application of the power source voltage (V_SOURCE) to the backlight illumination unit 120. Preferably, the switching unit 122 is a field effect transistor (FET).

The controller 124 measures the output voltage of the power source (V_SOURCE) and compares the measured voltage to a predetermined value. If the power source output (V_SOURCE) is at or above the predetermined value, the controller 124 generates the bypass enable signal (BYPASS_EN) to activate the switching unit 122. If the power source output is below the predetermined value, the controller 124 generates the converter enable signal (CONVERT_EN) to activate the converting unit 110.

The bypass enable (BYPASS_EN) and converter enable (CONVERT_EN) signals are logically ORed 135 to control the backlight power switch 130. In this way, when either the power source voltage (V_SOURCE) or the up-converted constant voltage level (V_CONST) from the converting unit 110 is applied to the backlight illumination unit 120, the LEDs (LED1, LED2, LED3) are illuminated. The controller 124 may also generate a backlight enable signal separate from the bypass enable signal (BYPASS_EN) and the converter enable signal (CONVERT_EN) with the backlight enable signal controlling the backlight power switch 130 independent of the on/off state of the converting unit 110 and switching unit 122.

A scaling function 137 such as first and second voltage-dividing resistors R10 and R20 may be provided to divide the power source voltage (V_SOURCE), preferably in half. If the power source voltage is scaled, the predetermined value to which the divided voltage is compared is also scaled. For example, if it is desired to bypass the converting unit 110 if the power source voltage (V_SOURCE) is equal to or greater than approximately 4 Volts DC, the halved voltage would be compared to a predetermined value of approximately 2 Volts DC.

The controller 124 preferably includes an analog-to-digital converter (ADC) 110 for converting the power source voltage (V_SOURCE) into digital data with the digital data compared to data corresponding the predetermined value. The controller 124 preferably also includes a general-purpose input/output (GPIO) unit 139 for outputting the bypass enable signal (BYPASS_EN) and the converter enable signal (CONVERT_EN).

Figures 3, 4:
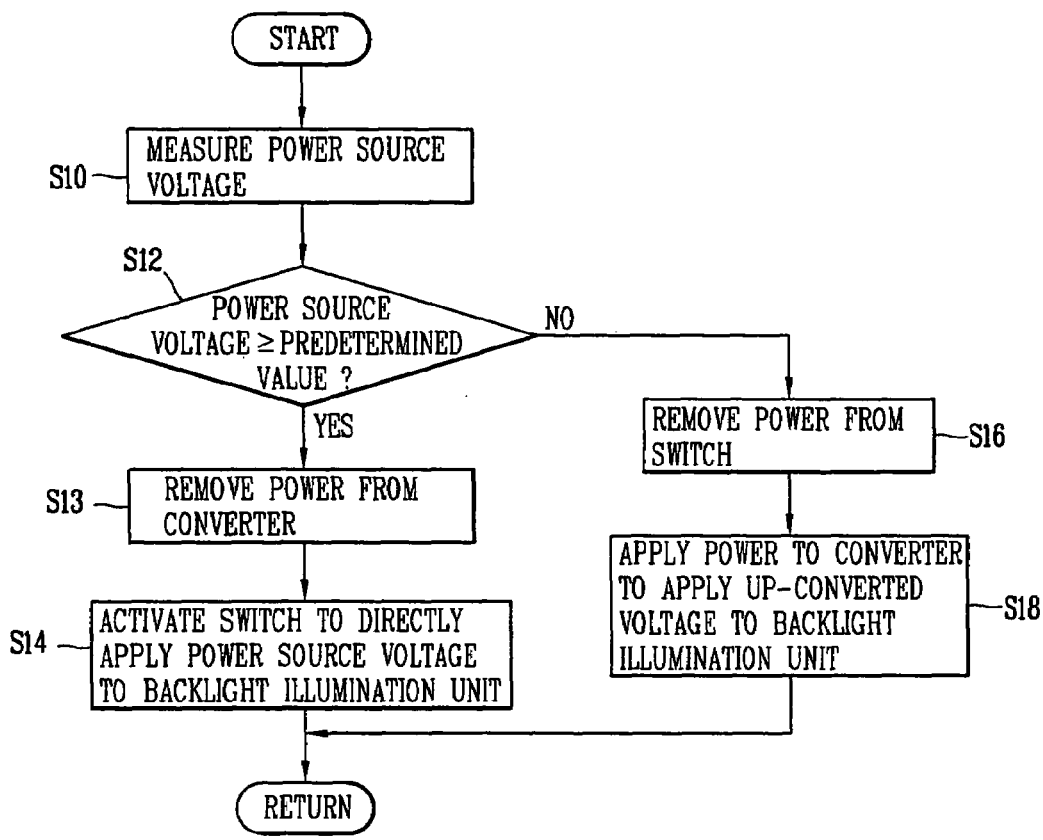
FIG. 3 illustrates a method for controlling the application of power to a backlight illumination unit of a mobile communication device in accordance with the present invention.
FIG. 4 illustrates the state of control signals generated by the controller in accordance with the present invention.

Referring to FIG. 3, a method for controlling the application of power to a backlight illumination unit of a mobile communication device in accordance with an apparatus of the present invention is illustrated. The method includes measuring the voltage output of a power source (V_SOURCE), comparing the voltage to a predetermined value and applying either the output of the power source or a constant voltage level (V_CONST) to a backlight illumination unit 120.

In step S10 the controller 124 measures the voltage level of a power source (V_SOURCE). The measurement may include dividing the power source output (V_SOURCE) by a scaling function 137 and converting the measured voltage to digital data utilizing an ADC 126.

In step S12, the measured voltage level is compared to the predetermined value. The comparison may include comparing digital data from the ADC 126 to data corresponding to the predetermined value.

If the measured voltage level is equal to or greater than the predetermined value, the controller 124 disables the converter enable signal (CONVERT_EN) in step S13 and generates the bypass enable signal (BYPASS_EN) in step S14 to remove power from the converting unit 110 and enable the switching unit 122. In this manner, when the output of the power source (V_SOURCE) is equal to or greater than the predetermined value, the converting unit 110 draws no power and the output of the power source is applied directly to the backlight illumination unit 120, thereby reducing power consumption of the power source.

If the measured voltage level is smaller than the predetermined value, the controller 124 disables the bypass enable signal (BYPASS_EN) in step S16 and generates the converter enable signal (CONVERT_EN) in step S18 to disable the switching unit 122 and turn on the converting unit 110. In this manner, when the output of the power source (V_SOURCE) is smaller than the predetermined value, the converting unit 110 up-converts the output (V_SOURCE) of the power source and a constant voltage level (V_CONST) is applied to the backlight illumination unit 120, thereby preventing the dimming of the LEDs as the power source is drained.

Referring to FIG. 4, the high (H) and low (L) states of the control signals generated by the controller 124 according to the level of the power source voltage (V_SOURCE) are illustrated. The backlight illumination unit 120 is powered unless both the bypass enable (BYPASS_EN) and converter enable (CONVERT_EN) signals are low. The converting unit 110 is powered if the converter enable (CONVERT_EN) signal is high and the switching unit 122 is enabled if the bypass enable (BYPASS_EN) signal is high.

The apparatus and method of the present invention has several advantages. Because the output of the power source is applied directly to the backlight illumination unit when the voltage level is high enough to properly illuminate the LEDs, unnecessary power consumption by the converting unit is avoided and power consumption of the backlight control unit can be reduced, thereby increasing use time before power source recharging is required. Because the output of the power source is up-converted to a constant voltage level by a converter when the voltage level is not high enough to properly illuminate the LEDs, no dimming of the backlight illumination unit occurs as the power source discharges.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for reducing power consumption in a mobile communication device having a backlight illumination unit powered by a voltage source, the apparatus comprising:
   converting means providing a constant voltage output;
   enabling means turning the converting means off and on; and
   switching means applying one of the voltage source output and the constant voltage output to the backlight illumination unit,
   wherein the enabling means:
   converts the voltage source output to digital data and determines if the digital data corresponds to a predetermined value; and
   turns the converting means off and controls the switching means to apply the voltage source output to the backlight illumination unit when the voltage source output is at least the predetermined value and turns the converting means on and applies the constant voltage output to the backlight illumination unit when the of the voltage source output is below the predetermined value.

2. The apparatus of claim 1, further comprising scaling means dividing the of the voltage source output by a designated factor.

3. The apparatus of claim 2, wherein the designated factor is approximately 50%.

4. The apparatus of claim 1, wherein the enabling means comprises an analog-digital converter.

5. The apparatus of claim 1, wherein the converting means is one of a charge-pump and a DC-DC converter.

6. The apparatus of claim 1, further comprising a second enabling means turning the backlight illumination unit off independent of the converting means.

7. The apparatus of claim 6, wherein the second enabling means comprises a transistor.

8. The apparatus of claim 1, wherein the switching means comprises a FET.

9. An apparatus for reducing power consumption in a mobile communication device having a display, the apparatus comprising:
   a voltage source;
   a backlight illumination unit illuminating the display;
   a converting unit providing a constant voltage to the backlight illumination unit;
   a switching unit bypassing the converting unit and applying the voltage source output to the backlight illumination unit; and
   a controller converting the voltage source output to digital data, determining the output voltage of the voltage source, turning the converting unit off and on, and enabling and disabling the switching unit such that one of the voltage source output and the constant voltage is applied to the backlight illumination unit.

10. The apparatus of claim 9, wherein the controller turns off the converting unit and enables the switching unit when the voltage source output is at least a predetermined value.

11. The apparatus of claim 9, further comprising a scaling unit dividing the voltage source output by a designated factor.

12. The apparatus of claim 11, wherein the scaling unit comprises at least one resistor.

13. The apparatus of claim 11, wherein the designated factor is approximately 50%.

14. The apparatus of claim 9, wherein the controller comprises an analog-digital converter.

15. The apparatus of claim 9, wherein the converting unit is one of a charge-pump and a DC-DC converter.

16. An apparatus for reducing power consumption in a mobile communication device having a display, the apparatus comprising:
   a voltage source;
   a backlight illumination unit illuminating the display;
   a converting unit providing a constant voltage to the backlight illumination unit;
   a switching unit bypassing the converting unit and applying the voltage source output to the backlight illumination unit; and
   a controller determining the output voltage of the voltage source, turning the converting unit off and on, and enabling and disabling the switching unit such that one of the voltage source output and the constant voltage is applied to the backlight illumination unit,
wherein the controller independently turns off the backlight illumination unit and converting unit.

17. The apparatus of claim 9, wherein the switching unit comprises a FET.

18. A mobile communication device, comprising:
a display;
a backlight illumination unit illuminating the display;
a voltage source providing power to the backlight illumination unit;
a converter providing a constant voltage;
a switch applying one of the voltage source output and the constant voltage to the backlight illumination unit; and
a controller turning the converter off and applying the voltage source output to the backlight illumination unit when the voltage source output is at least a predetermined value and turning the converter on and applying the constant voltage to the backlight illumination unit when the voltage source output is below the predetermined value,
wherein the predetermined value is approximately 4 Volts DC.

19. The device of claim 18, wherein the converter is one of a charge pump and a DC-DC converter.

20. A mobile communication device, comprising:
a display;
a backlight illumination unit illuminating the display;
a voltage source providing power to the backlight illumination unit, the backlight illumination unit comprising two or more LEDs;
a converter providing a constant voltage;
a switch applying one of the voltage source output and the constant voltage to the backlight illumination unit; and
a controller turning the converter off and applying the voltage source output to the backlight illumination unit when the voltage source output is at least a predetermined value and turning the converter on and applying the constant voltage to the backlight illumination unit when the voltage source output is below the predetermined value.

21. A mobile communication device, comprising:
a display;
a backlight illumination unit illuminating the display;
a voltage source providing power to the backlight illumination unit;
a converter providing a constant voltage;
a switch applying one of the voltage source output and the constant voltage to the backlight illumination unit; and
a CPU turning the converter off and applying the voltage source output to the backlight illumination unit when the voltage source output is at least a predetermined value and turning the converter on and applying the constant voltage to the backlight illumination unit when the voltage source output is below the predetermined value.

22. The device of claim 18, wherein the controller comprises a general purpose input/output (GPIO) unit.

23. The device of claim 18, wherein the display is an LCD.

24. A method for reducing power consumption in a mobile communication device having a backlight illumination unit powered by a voltage source, the method comprising:
generating a constant voltage output;
converting the voltage source output to digital data;
measuring the voltage source output;
comparing the digital data to data corresponding to the predetermined value; and
applying one of the voltage source output and the constant voltage output to the backlight illumination unit,
wherein the voltage source output is applied to the illumination unit if the voltage source output is at least a predetermined value and the constant voltage output is applied to the backlight illumination unit if the voltage source output is below the predetermined value.

25. The method of claim 24, further comprising scaling the voltage source output by a designated factor.

26. The method of claim 25, wherein the designated factor is approximately 50%.

27. The method of claim 24, wherein the constant voltage output is at least the predetermined value.

28. The method of claim 24, further comprising turning off the backlight illumination unit independent from a converting means that generates the constant voltage output.

* * * * *